United States Patent
Kadota

(10) Patent No.: US 8,116,958 B2
(45) Date of Patent: Feb. 14, 2012

(54) SYSTEM AND METHOD FOR CONTROLLING DRIVING FORCE OF HYBRID ELECTRIC VEHICLE

(75) Inventor: Keiji Kadota, Chiba (JP)

(73) Assignees: Hyundai Motor Company, Seoul (KR); Kia Motors Corporation, Seoul (KR); Hyundai Kia Motor Japan R&D Center Inc., Chiba (JP)

( * ) Notice: Subject to any disclaimer, the term of this patent is extended or adjusted under 35 U.S.C. 154(b) by 684 days.

(21) Appl. No.: 12/286,568

(22) Filed: Oct. 1, 2008

(65) Prior Publication Data

US 2009/0171538 A1 Jul. 2, 2009

(30) Foreign Application Priority Data

Dec. 27, 2007 (JP) .................. 2007-337612

(51) Int. Cl.
*B60T 8/32* (2006.01)
*B60K 6/20* (2007.10)
*B60K 1/02* (2006.01)

(52) U.S. Cl. ............ 701/93; 180/65.21; 477/3
(58) Field of Classification Search ............ 701/22, 701/35, 208, 213, 211, 300, 67, 68; 180/65.1, 180/65.21, 65.8; 340/995.1–995.19; 477/3, 477/5, 6, 8, 39, 62, 70, 74, 86, 87, 90
See application file for complete search history.

(56) References Cited

U.S. PATENT DOCUMENTS

| 7,415,350 B2 * | 8/2008 | Nishikiori ............... 701/112 |
| 2006/0162324 A1 * | 7/2006 | Pott et al. ............... 60/299 |
| 2008/0058154 A1 * | 3/2008 | Ashizawa et al. ......... 477/5 |

FOREIGN PATENT DOCUMENTS

| JP | 2000-225871 A | 8/2000 |
| JP | 2002-349309 | 12/2002 |
| JP | 2007-069789 | 3/2007 |
| JP | 2007-069804 | 3/2007 |
| JP | 2007-126082 | 5/2007 |
| KR | 2007-0105394 | 10/2007 |

* cited by examiner

*Primary Examiner* — James Trammell
*Assistant Examiner* — Muhammad Shafi
(74) *Attorney, Agent, or Firm* — Edwards Wildman Palmer LLP; Peter F. Corless

(57) ABSTRACT

The present invention provides a system and method for controlling a driving force of a hybrid electric vehicle which can reduce clutch engagement shock generated during transition from an electric operation mode to an internal combustion engine running mode. For this purpose, the present invention provides a driving force control system of a hybrid electric vehicle including an engine, a motor-generator and a clutch, in which at least one starter-generator directly connected to the engine. The output torques of the engine and the starter-generator are controlled so as to make a difference between the rotational speed of the engine and the rotational speed of the motor-generator reach a predetermined threshold value, and the clutch is engaged when the difference between the rotational speeds reach the value.

6 Claims, 4 Drawing Sheets

SYSTEM AND METHOD FOR CONTROLLING DRIVING FORCE OF HYBRID ELECTRIC VEHICLE

CROSS-REFERENCE TO RELATED APPLICATION

This application claims under 35 U.S.C. §119(a) the benefit of Korean Patent Application No. 10-2008-0007748 filed Jan. 25, 2008, the entire contents of which are incorporated herein by reference.

BACKGROUND (a) Technical Field

The present invention relates to a driving force control of a hybrid electric vehicle. More particularly, the present invention relates to a system and method for controlling a driving force of a hybrid electric vehicle which can reduce impact shock during clutch engagement by starting an engine while the hybrid electric vehicle is driven by a motor-generator.

(b) Background Art

In general, a driving system of a hybrid electric vehicle includes an engine, a motor-generator, and a clutch for controlling connection and disconnection between the engine and the motor-generator. While the vehicle is driven by the engine or by both the engine and the motor-generator, the clutch is in a connected state or in a slip state. Meanwhile, while the vehicle is driven only by the motor-generator without using the engine, the clutch is opened to disconnect the engine from the motor-generator. If there is the necessity of using the driving force of the engine while the vehicle is driven only by the motor-generator, that is, if it is more advantageous to drive the vehicle in combination with the engine and the motor-generator at a high speed or in a case where a driver abruptly depresses an accelerator pedal, the engine is started and the clutch is connected thereto, thus using the driving force of the engine.

During the clutch engagement, if the rotational speed of the engine and that of a clutch plate are different from each other, impact or noise is generated in the vehicle. The engine has a low response to a control command. As a result, the rotational speed of the engine may be rapidly increased with a time lag, if the output is increased in a state that the engine operates at a low load, making it difficult to adapt the rotational speed of engine to a high rotational speed upon start-up thereof. Thus, there has been a need for a device or method for preventing an impact caused by the clutch engagement during transition from an electric motor running mode to an internal combustion engine running mode in the conventional hybrid electric vehicle.

Japanese Patent Publication No. 2006-347431 discloses a method for controlling rotational speed and torque of an engine by means of fuel cut, ignition timing delay, or throttle opening adjustment during clutch engagement. The method, however, has a drawback. For example, control of the rotational speed is insufficient. Furthermore, a difference between the rotational speed of engine and that of clutch may be increased, thus causing vibration and noise during the clutch engagement.

Japanese Patent Publication No. 2006-054940 discloses a method for controlling a rotational speed of an engine during start-up thereof using a motor. The method, however, has a drawback. For example, it includes a centrifugal clutch automatically engaged when the rotational speed of the engine is increased, the motor only functions to supplement an insufficient engine torque upon start-up, making it impossible to accurately control the rotational sped and torque of the engine and thus causing vibration and noise during the clutch engagement.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides a driving force control system of a hybrid electric vehicle, including at least one motor-generator, a motor-generator rotational speed detection means for detecting a rotational speed of the motor-generator, a motor-generator control means for controlling the motor-generator, an engine, an engine rotational speed detection means for detecting a rotational speed of the engine, an engine control means for controlling the engine, a clutch for controlling connection and disconnection between the motor-generator and the engine, a clutch control means for controlling the clutch, and a power transmission control means for transmitting and interrupting driving forces of the motor-generator and the engine, the system comprising at least one starter-generator directly connected to the engine, wherein output torques of the engine and the starter-generator are controlled so as to make a difference between the rotational speed of the engine and the rotational speed of the motor-generator become smaller, and the clutch is engaged when the difference between the rotational speeds reaches a predetermined threshold value.

In another aspect, the present invention provides a driving force control method of a hybrid electric vehicle, the method comprising: detecting a rotational speed of a motor-generator and a rotational speed of an engine; detecting a difference between the rotational speeds; connecting a power transmission control means to the engine when the difference in the rotational speeds reach a predetermined threshold value.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above and other features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Figure 1:
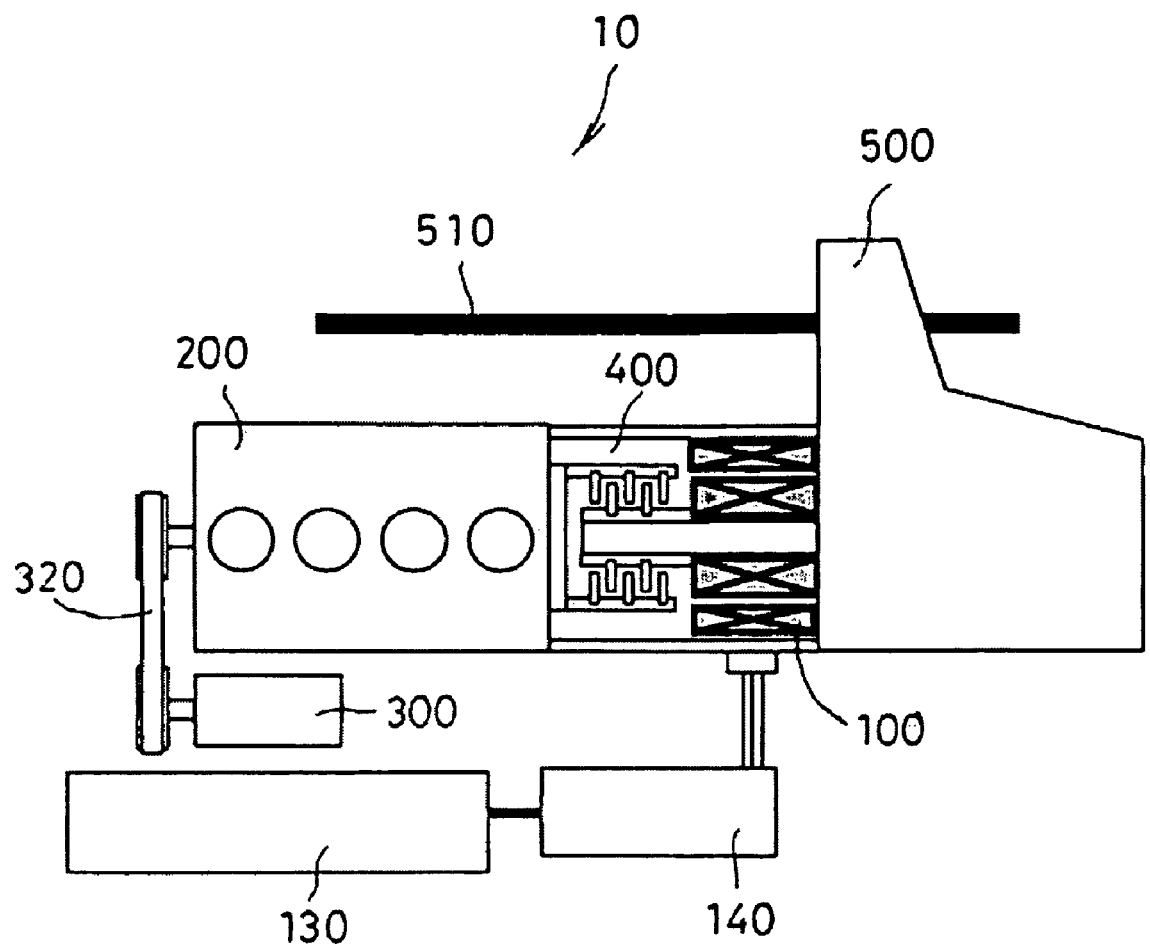
FIG. 1 is a side schematic view of a driving force control system of a hybrid electric vehicle in accordance with a preferred embodiment of the present invention.

Reference numerals set forth in the Drawings includes reference to the following elements as further discussed below:

| | |
|---|---|
| 10: driving force control system | 20: vehicle acceleration |
| 100: motor-generator | 130: battery |
| 140: inverter | 150: motor-generator rotational speed |
| 200: engine | 220: engine control means |
| 230: engine rotational speed | 240: engine torque |
| 250: proportional control means | 252: integral control means |
| 254: differential control means | 260: engine friction torque |
| 300: starter-generator | 310: starter-generator control means |
| 320: belt | 330: starter-generator torque |
| 400: clutch | 410: clutch control means |
| 420: clutch pressing force | 500: power transmission control means |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

The term "engine" used in the detailed description and claims denotes an internal combustion engine, for example, having an inferior controllability compared with an electric motor.

Figure 2:
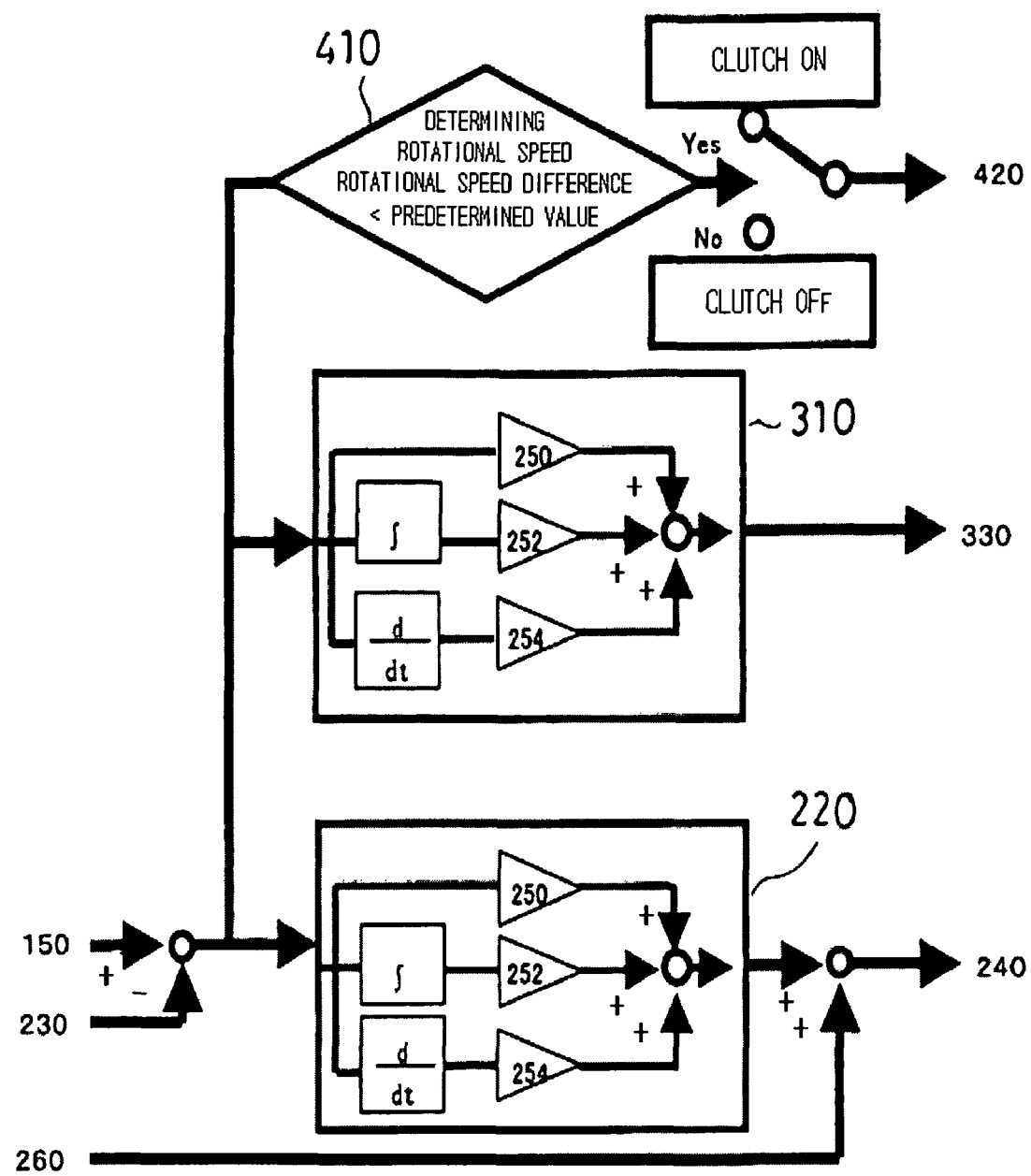
FIG. 2 is a block diagram showing the function of the driving force control system in accordance with the present invention.

FIG. 1 is a side schematic view of a driving force control system of a hybrid electric vehicle in accordance with a preferred embodiment of the present invention, and FIG. 2 is a block diagram showing the configuration and function of the driving force control system in accordance with the present invention.

As shown in FIGS. 1 and 2, the driving force control system 10 in accordance with the present invention includes an electric operation device, an internal combustion engine running device, a starter-generator system, and a clutch system.

The electric operation device includes at least one motor-generator 100, a motor-generator rotational speed detection means (not shown) for detecting the rotational speed of the motor-generator 100, and a motor-generator control means 120 for controlling the motor-generator 100.

The motor-generator 100 functions as an electric generator to charge a battery 130. Moreover, the motor-generator 100 as an electric motor provides a driving force to the vehicle using electric power supplied from the battery 130 through an inverter 140.

The internal combustion engine running device includes an engine 200, an engine rotational speed detection means (not shown) for detecting the rotational speed of the engine 200, an engine control means 220 for controlling the engine 200.

The engine 200 shows a slow response to a control command. That is, if the output is increased in a state that there is no torque load, the rotational speed can be rapidly increased with a time lag. Accordingly, it is difficult to stably control the engine 200 at a high rotational speed upon start-up of the engine 200.

The starter-generator system includes at least one starter-generator 300 connected to the engine 200, a starter-generator control means 310, and a belt 320.

The starter-generator 300 shows a fast and accurate response at a low rotation speed. However, it has a low output since it has a small size and, especially, it cannot output a large torque at a high rotational speed. The starter-generator 300 functions as an acceleration device when the rotational speed during start-up of the engine 200 is low and functions to control the rotational speed and torque of the engine 200 as a sub-control means for limiting the rotational speed of the starter-generator 300 when the rotational speed of the engine 200 is rapidly increased.

The clutch system includes a clutch 400 for controlling connection and disconnection between the motor-generator 100 and the engine 200, and a clutch control means 410 for controlling the clutch 400.

A driving force generated from the driving force control system 10 is transmitted to a driving shaft 510 through a power transmission control means 500.

The motor-generator control means 120, the engine control means 220, the starter-generator control means 310, and the clutch control means 410 are controlled by a central control unit (not shown).

As shown in FIG. 2, the present invention controls torque gains of the engine 200 and the starter-generator 300 with an engine rotational speed 230 as an input value and a motor-generator rotational speed 150 as a target value using a proportional control means 250 (P control) corresponding to a difference between the engine rotational speed 230 and the motor-generator rotational speed 150, an integral control means 252 (I control) corresponding to an integral value of the difference, and a differential control means 254 (D control) corresponding to a differential value of the difference.

The proportional control means 250 controls the rotational speed of the engine 200 by setting an output value to a predetermined rate with respect to the difference between the engine rotational speed 230 as an input value and the motor-generator rotational speed 150 as a target value. Since the engine 200 has such a feature that the rotational speed is rapidly increased if the load is low, a fast response with a high response frequency is required in the proportional control means 250. Meanwhile, although the starter-generator control means 310 shows a fast and accurate response in a low rotation speed region, the starter-generator 300 has a low output since it has a small size and, especially, it cannot output a larger torque at a high rotational speed. In the present invention, the proportional control means 250 sets the torque gain of the starter-generator 300 to become larger than that of the engine 200.

The integral control means 252 controls the engine rotational speed 230 by changing the target output value correspondingly to a time integral of the difference between the motor-generator rotational speed 150 and the engine rotational speed 230. If the difference becomes smaller, the difference between the target output value and the engine rotational speed 230 is also decreased, and thus the response frequency of the integral control means 252 is relatively low. In the present invention, the integral control means 252 sets the torque gain of the starter-generator 300 to become smaller than that of the engine 200.

The differential control means 254 is a control means corresponding to a differential value of the difference between the motor-generator rotational speed 150 and the engine rotational speed 230. If there is a rapid change in the difference between the rotational speeds of the motor-generator 100 and the engine 200, the differential control means 254 controls the rotational speed of the engine 200 by setting an output value corresponding to the change. Since the differential control means 254 cannot prevent the rapid change if the response is slow, a fast response with a high response frequency is required. In the present invention, the differential control means 254 sets the torque gain of the starter-generator 300 to become larger than that of the engine 200.

According to FIG. 2, the motor-generator rotational speed 150 and the engine rotational speed 230 are input to the engine control means 220 and the starter-generator control means 310. Then, the engine control means 220 and the starter-generator control means 310 output an engine torque 240 and a starter-generator torque 330, respectively, corresponding to the proportional control means 250, the integral control means 252 and the differential control means 254, thus controlling the engine 200 and the starter-generator 300.

If the sum total of the proportional control means 250, the integral control means 252 and the differential control means 254 reaches an output limit of the starter-generator 300, the starter-generator 300 can no longer perform the control output. Accordingly, an integral term for ensuring a sufficient output of a proportional term and a differential term is set to be extremely small.

As described above, since the engine 200 has such a feature that the rotational speed is rapidly increased with a small torque gain if it runs idle without a load, an engine friction torque 260, which makes the engine 200 run idle according to the rotational speed of the starter-generator 300, is applied to control the torque of the engine 200.

Applying the engine friction torque 260 to the engine 200 makes it possible to have low output values of the engine control means 220 and the starter-generator control means 310 may be small, and decrease the output values of the respective control means. As a result, it is possible to improve the control response without any loss of control stability.

The clutch control means 410 determines a difference between the rotational speeds of the engine 200 and the motor-generator 100 and, if the difference is below a predetermined threshold value, turns on a hydraulic device (not shown) to engage the clutch.

Figure 3:
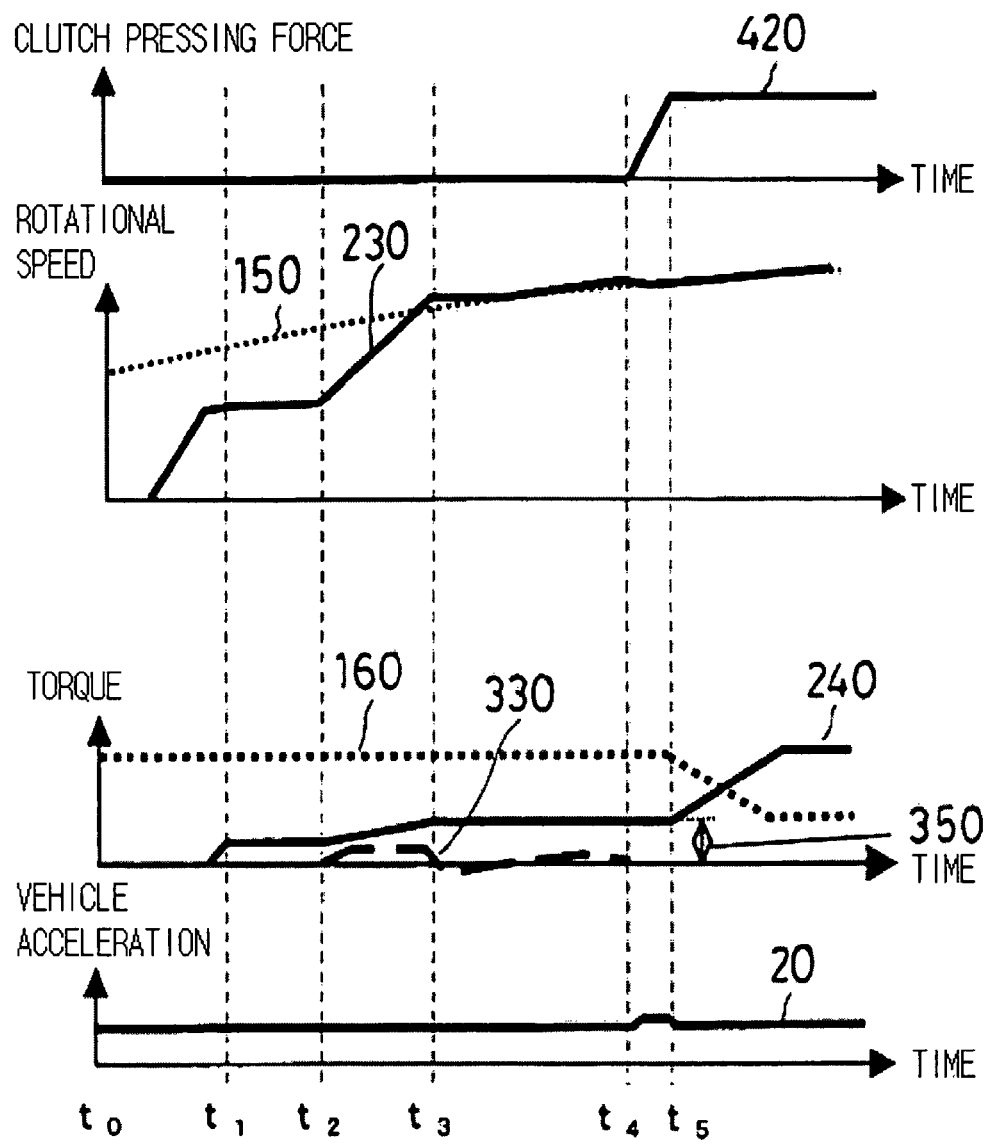
FIG. 3 is a diagram showing the relationship between time, rotational speed and torque after engine start-up in accordance with the present invention.

The following example illustrates the invention with reference to FIG. 3 and are not intended to limit the same.

Example

If an accelerator pedal is depressed at to when the vehicle is running, the motor-generator 100 immediately responds thereto; however, since the output is low, the rotational speed gets slowly increased.

In order to meet the driver's demand, a central control unit 520 commands the start-up of the engine 200 and makes the engine 200 rotate at low torque and low speed from $t_1$ to $t_2$ to stabilize the combustion. Then, the central control unit 520 increases the rotational speed of the engine 200 in combination with the proportional control means 250 of the starter-generator 300.

At $t_3$, if the engine rotational speed 230 reaches the motor-generator rotational speed 150, the difference is rapidly changed from negative to positive. Accordingly, the differential control means 254 of the starter-generator 300 functions to reduce the engine rotational speed 230. From $t_3$ to $t_4$, the engine 200 and the starter-generator 300 are rotated in accordance with the rotational speeds of the engine 200 and the motor-generator 100 by the respective control means shown in FIG. 2 and, at the same time, stabilize the friction torque load that makes the engine 200 run idle.

The clutch control means 410 determines a difference between the engine rotational speed 230 and the motor-generator rotational speed 150 and, if the difference is below a predetermined threshold value, applies a clutch pressing force 420 at $t_4$ such that a change in a vehicle acceleration 20 between $t_4$ and $t_5$ becomes smaller. Like this, since both the engine 200 and the starter-generator 300 that quickly responds to the engine 200 are used to control the rotational speed of the engine 200, it is possible to reduce the clutch engagement shock generated during transition from an electric operation mode to an internal combustion engine running mode.

Figure 4:
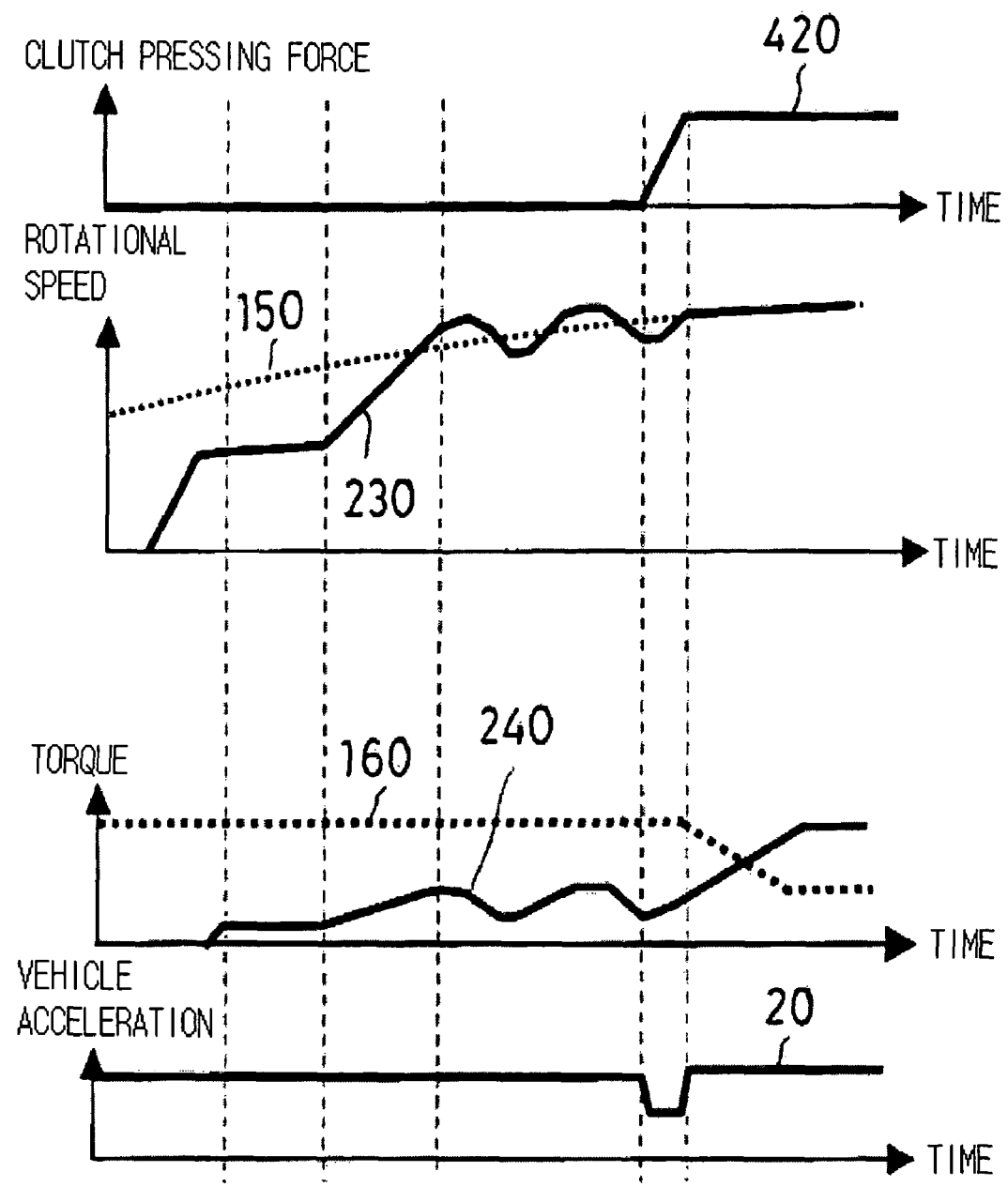
FIG. 4 is a diagram showing the relationship between time, rotational speed and torque after engine start-up in accordance with prior art.

A comparative example, in which the starter-generator 300 is excluded from the configuration of the example, will be described with reference to FIG. 4.

Comparative Example

Since the operation till $t_2$ is the same as the above example, the description will be omitted. At $t_2$, the engine rotational speed 230 is increased using the engine control means 220. Although the rotational speed of the engine 200 reaches the rotational speed of the motor-generator 100 at $t_3$, since the engine 200 has a slow response to the control command, the engine rotational speed 230 exceeds the motor-generator rotational speed 150 and then the rotational speed control becomes insufficient. Moreover, since the rotational speed is not stabilized, the friction torque is not stabilized.

The clutch control means 410 determines a difference between the engine rotational speed 230 and the motor-generator rotational speed 150 and, if the difference is below a predetermined threshold value, applies a clutch pressing force 420 at t4 so as to engage the clutch between $t_4$ and $t_5$. However, since the rotational speed difference is large and the torque of the engine 200 is not stabilized, the change in the vehicle acceleration 20 between $t_4$ and $t_5$ is large, causing the clutch engagement shock.

As described above, according to the system and method for controlling the driving force of the hybrid electric vehicle of the present invention, since both the engine and the starter-generator that quickly responds to the engine are used to control the rotational speed of the engine, it is possible to reduce the clutch engagement shock generated during transition from an electric operation mode to an internal combustion engine running mode.

Moreover, by setting the torque gain of the starter-generator to become larger than that of the engine in the P control and D control while setting it to become smaller in the I control, the control response frequency of the engine and that of the starter-generator may differ from each other, and thus it is possible to prevent a resonance or interference of torque outputs.

Furthermore, since the torque gain of the starter-generator is set to be smaller than that of the engine in the I control, the engine and the starter-generator are balanced with each other in a state that the torque is output in the opposite direction of the engine, and thus it is possible to reduce unnecessary output.

In addition, since the torque of the motor-generator is controlled by the friction torque that makes the motor-generator run idle according to the rotational speed of the starter-generator, it is possible to set the output values of the control means for controlling the engine and the starter-generator to become small, thus improving the control response without any loss of control stability.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A driving force control system of a hybrid electric vehicle, including at least one motor-generator, a motor-generator rotational speed detection means for detecting a rotational speed of the motor-generator, a motor-generator control means for controlling the motor-generator, an engine, an engine rotational speed detection means for detecting a rotational speed of the engine, an engine control means for controlling the engine, a clutch for controlling connection and disconnection between the motor-generator and the engine, a clutch control means for controlling the clutch, and a power transmission control means for transmitting and interrupting driving forces of the motor-generator and the engine, the system comprising at least one starter-generator directly connected to the engine, wherein output torques of the engine and the starter-generator are controlled so as to make a difference between the rotational speed of the engine and the rotational speed of the motor-generator become smaller, and the clutch is engaged when the difference between the rotational speeds reaches a predetermined threshold value, and the control of the output torques is performed by at least one of a control (P control) corresponding to the rotational speed difference, a control (D control) corresponding to a differential value of the rotational speed difference, and a control (I control) corresponding to an integral value of the rotational speed difference, the P and D controls being performed so as to make a torque gain of the starter-generator become larger than that of the engine, and the I control being performed so as to make the torque gain of the starter-generator become smaller than that of the engine.

2. The system of claim 1, wherein the output torque of the engine is controlled by the rotational speed difference and a friction torque required to make the engine run idle according to the rotational speed of the starter-generator.

3. The system of claim 1, wherein the output torque of the engine is controlled by the rotational speed difference and a friction torque required to make the engine run idle according to the rotational speed of the starter-generator.

4. A driving force control method of a hybrid electric vehicle, the method comprising:

detecting a rotational speed of a motor-generator and a rotational speed of an engine;

detecting a difference between the rotational speeds; and connecting a power transmission control means to the engine when the difference in the rotational speeds reaches a predetermined threshold value, wherein output torques of the engine and the starter-generator are controlled by at least one of a control (P control) corresponding to the rotational speed difference, a control (D control) corresponding to a differential value of the rotational speed difference, and a control (I control) corresponding to an integral value of the rotational speed difference, the P and D controls being performed so as to make a torque gain of the starter-generator become larger than that of the engine, and the I control being performed so as to make the torque gain of the starter-generator become smaller than that of the engine.

5. The method of claim 4 wherein the output torque of the engine is controlled by a friction torque required to make the engine run idle according to the rotational speed of the starter-generator.

6. The method of claim 4, wherein the output torque of the engine is controlled by a friction torque required to make the engine run idle according to the rotational speed of the starter-generator.

* * * * *